US009949269B2

(12) United States Patent
Axmon et al.

(10) Patent No.: US 9,949,269 B2
(45) Date of Patent: Apr. 17, 2018

(54) CONDITIONAL NETWORK CAPABILITIES FOR IMPROVED SYSTEM PERFORMANCE

(71) Applicant: Telefonaktiebolaget L M Ericsson (publ), Stockholm (SE)

(72) Inventors: Joakim Axmon, Kävlinge (SE); Ali Nader, Malmö (SE); Håkan Palm, Växjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/780,311

(22) PCT Filed: Aug. 10, 2015

(86) PCT No.: PCT/EP2015/068340
§ 371 (c)(1),
(2) Date: Sep. 25, 2015

(87) PCT Pub. No.: WO2016/023854
PCT Pub. Date: Feb. 18, 2016

(65) Prior Publication Data
US 2016/0234825 A1    Aug. 11, 2016

Related U.S. Application Data

(60) Provisional application No. 62/037,980, filed on Aug. 15, 2014.

(51) Int. Cl.
*H04W 72/04* (2009.01)
*H04W 8/24* (2009.01)
(Continued)

(52) U.S. Cl.
CPC ........... *H04W 72/048* (2013.01); *H04W 8/00* (2013.01); *H04W 8/24* (2013.01); *H04W 72/0413* (2013.01); *H04W 88/06* (2013.01)

(58) Field of Classification Search
CPC ..... H04W 88/06; H04W 72/048; H04W 8/24; H04W 72/0413; H04W 28/18
See application file for complete search history.

(56) References Cited

U.S. PATENT DOCUMENTS

| 2008/0201748 A1* | 8/2008 | Hasek | ................ H04N 7/17309 725/98 |
| 2011/0216719 A1* | 9/2011 | Faurie | ..................... H04W 8/24 370/329 |

(Continued)

FOREIGN PATENT DOCUMENTS

| EP | 2400790 A1 | 12/2011 |
| WO | 2013112952 A1 | 8/2013 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, 1-209.

(Continued)

*Primary Examiner* — Charles Appiah
*Assistant Examiner* — Margaret G Mastrodonato
(74) *Attorney, Agent, or Firm* — Murphy, Bilak & Homiller, PLLC

(57) ABSTRACT

The disclosure pertains to the field of reporting network capabilities in a cellular communication network. The disclosure relates to a method, performed in a wireless device 1, for providing a network capability report to a radio network node 10, wherein the wireless device and the radio network node are comprised in a wireless communications network. The method comprises receiving S2 from a network node 10, 4 in the wireless communications network 20 information specifying features that the wireless communication network supports for the wireless device 1. The (Continued)

method further comprises determining S3 capabilities of the wireless device with regard to the specified features and sending S4 to the radio network node 10 a network capability report message defining the capabilities of the wireless device with respect to the specified features. The disclosure also relates to corresponding nodes and to a computer program.

8 Claims, 12 Drawing Sheets

(51) Int. Cl.
    *H04W 8/00*     (2009.01)
    *H04W 88/06*     (2009.01)

(56) References Cited

U.S. PATENT DOCUMENTS

| | | |
|---|---|---|
| 2013/0250827 A1 | 9/2013 | Patwardhan et al. |
| 2014/0112247 A1 | 4/2014 | Chen et al. |
| 2015/0271806 A1* | 9/2015 | Kim ..................... H04L 5/0007 455/452.1 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.6.0, Jun. 2015, 1-254.
3GPP, "3rd Generation Partnership Project; Technical Specification Group Radio Access Network; Evolved Universal Terrestrial Radio Access (E-UTRA); Base Station (BS) radio transmission and reception (Release 11)", 3GPP TS 36.104 V11.4.0, Mar. 2013, 1-134.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.6.0, Jun. 2015, 1-264.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 1-344.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, Jun. 2014, 1-365.
3GPP, "3rd Generation Partnership Project; Technical Specification Group Radio Access Network; Evolved Universal Terrestrial Radio Access (E-UTRA); User Equipment (UE) radio access capabilities (Release 12)", 3GPP TS 36.306 V12.5.0, Jun. 2015, 1-44.
3GPP, "3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, Dec. 2013, 1-71.
3GPP, "General Packet Radio Service (GPRS) enhancements for Evolved Universal Terrestrial Radio Access Network (E-UTRAN) access (Release 12)", 3GPP TS 23.401 V12.5.0, Jun. 2014, 1-305.
Unknown, Author, "Selective UE capability reporting", 3GPP TSG-RAN WG2#86 R2-142435 Seoul, South Korea Source: Alcatel-Lucent, May 19-23, 2014, pp. 1-4.

* cited by examiner

CONDITIONAL NETWORK CAPABILITIES FOR IMPROVED SYSTEM PERFORMANCE

TECHNICAL FIELD

The disclosure pertains to the field of reporting network capabilities in a cellular communication network. More particularly the disclosure relates to a method in a cellular communication network of reporting and receiving conditional network capabilities, as well as to a corresponding node and to a computer program. A conditionally supported function or feature refers to a feature that the wireless device, when configured with certain set of features, cannot support to full extent.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or User Equipment units, UEs, communicate via a Radio Access Network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a UE is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

Carrier Aggregation

Carrier aggregation was introduced in Release 10 of the E-UTRAN standard as a means for qualifying E-UTRAN to meet the requirements for 4G (1000 Mbit/s) as well as for allowing operators with small (less than 20 MHz) scattered spectrum allocations to provide a good user experience by aggregating the scattered allocations into e.g. 10, 20 MHz or more.

In Carrier Aggregation the UE is connected to a serving cell termed Primary Cell (PCell) on what is referred to as the Primary Component Carrier (PCC). Mobility is catered for on this carrier. In case the UE is using services that require high throughput, the network may activate one or more additional serving cells, each termed Secondary Cell (SCell), on what is referred to as Secondary Component Carrier(s). The activation may happen before or after the SCell has been detected by the UE.

Two types of aggregation scenarios are considered for Release 10:

Intra-band contiguous aggregation
Inter-band aggregation and in Release 11, one more is considered:

Intra-band non-contiguous aggregation.

For intra-band contiguous aggregation the PCell and SCell(s) are contiguous in frequency. It is required from the standard that for contiguous intra-band aggregation, the time difference between PCell and SCell is allowed to be at most ±130 ns (3GPP TS 36.104 rev 11.4.0, subclause 6.5.3). It is further assumed in the standard that for this particular scenario, one can use a single FFT to demodulate the signal from both PCell and SCell simultaneously. Thus, in practice it is required that the PCell and SCell are co-located, i.e., transmitted from the same site, since otherwise propagation delay would make it impossible to use a single FFT. For intra-band non-contiguous aggregation the timing difference is allowed to be at most ±260 ns, but no assumption is made on that the cells are co-located or that a single FFT can be used. For inter-band carrier aggregation the timing difference between the PCell and SCell is allowed to be at most ±260 ns. However for this scenario it is further assumed that the cells may be non-co-located and that the UE will have to cope with a propagation delay difference between PCell and SCell of up to ±30 μs, resulting in a maximum delay spread of ±30.26 us (3GPP TS 36.300 rev 11.5.0 Annex J).

From 3GPP LTE Rel. 12 and onwards so called inter-node radio resource aggregation is under discussion (3GPP TR 36.842). For one of the foreseen scenarios a UE may be connected to a primary cell (master cell) handled by one base station, and simultaneously connected to between one and four secondary cells (assisting cells) handled by other base station(s). In case the primary cell and secondary cell(s) are on different carriers, the UE can aggregate it similar to how it is done for the Rel. 11 deployment scenarios, with one difference namely that the cells are handled by different sites. Up to 3GPP Rel. 11 the aggregated cells were handled by the same base station with either co-located cells on different carriers but sent from the same site, or non-co-located cells on different carriers, where the carriers are using RRH (remote radio heads).

At a given location there may be multiple such layers, overlapping each other at least partially. Although current assumption in the standard is that the UE shall be capable of aggregating up to 5 carriers, there is no such limitation on the number of carriers within which the UE may be in coverage. It can be assumed that in future deployment scenarios e.g. 5G, virtually every suitable spectrum will be used in order to meet the targets for fifth generation of mobile communication systems (5G). It can also be foreseen that there will be a mix of large and small cells i.e. any combination of macro, micro, pico and femto cells, and a mix of intra-node and inter-node aggregation. Moreover for 5G mobile base stations are considered.

The macro cell is served by a wide area (WA) base station aka high power node (HPN). The maximum output power of a HPN can for example typically be between 43-49 dBm. Examples of low power nodes (LPNs) are micro node (aka medium range (MR) base station), pico node (aka local area (LA) base station), femto node (home base station (HBS)), relay node etc. The maximum output power of an LPN for example typically is between 20-38 dBm depending upon the power class. For example a pico node typically has a maximum output power of 24 dBm whereas HBS has a maximum output power of 20 dBm. The HBS, LA BS and MR BS serve femto cell, pico cell and micro cell respectively. The WA BS, HBS, LA BS and MR BS are therefore also called as different base station power classes.

A hypothetical deployment with 5 carriers is illustrated in FIG. 1a, where there are two layers with macro cells (F1 and F2), one layer with micro cells and picocells mixed (F3), one layer with picocells (F4), and one layer with femtocells (F5)—e.g. hotspots at café s, restaurants, etc. FIG. 1b illustrates cell coverage experienced by a UE that is experiencing cell coverage according to the example of FIG. 1a. The UE can be connected to one or more of the multitude of cells simultaneously, where the number of cells connected to at a given instant may depend on the throughput required for the currently used services.

Typical cell radii for the different kinds of cells are provided in Table 1 (below). The UE will go in and out of coverage of individual cells on one or more of the 5 carriers while mobile.

TABLE 1

Cell types and typical cell radius

| Cell type | Radius |
|---|---|
| Macro | >2000 m |
| Micro | 200-2000 m |
| Pico | 10-200 m |
| Femto | 0-10 m |

Wireless Device (e.g., UE) Radio Network Related Capability Information

According to the present 3GPP standard, the wireless device reports its network capabilities, called User Equipment, UE, capabilities, in a NW registration/attach phase. 3GPP TS 36.331 V12.10.0 defines the UE capability reporting procedure and the messages sent between eNodeB and the UE.

The purpose of this procedure is to transfer UE radio access capability information from the UE to E-UTRAN. If the UE has changed its E-UTRAN radio access capabilities, the UE shall request higher layers to initiate the necessary NAS procedures (see 3GPP TS 23.401 V12.5.0) that would result in the update of UE radio access capabilities using a new RRC (Radio Resource Control) connection.

To allow for a range of user equipment (UE)/wireless device implementations, different wireless device capabilities are specified. The wireless device capabilities may be used by the network to select a configuration that is supported by the wireless device. FIG. 2b illustrates an example of UE capability transfer.

In 3GPP standardization of E-UTRAN radio access, the UE radio network related capability information is transferred using RRC (Radio Resource Control) signaling from the UE (wireless device) to the eNodeB (eNB or base station).

Information on the UE radio network related capability information has to be present in the eNB in the RRC connected state of the UE. Moreover, when a handover is made from a first/source eNB to a second/target eNB the UE capability information needs to be moved from the source eNB to the target eNB.

However, in RRC idle state there is no need to maintain any information of the UE, including the UE capabilities, in the eNBs.

In order to avoid uploading the UE capabilities over the radio interface between the UE and the eNB each time the UE performs a transition to RRC connected state (i.e. when the UE specific context is created in the eNB), the eNB uploads the UE capability information to the Mobility Management Entity (MME) in the Evolved Packet Core (EPC) so that it can be stored there when the UE is in RRC idle state. When the UE next time returns to RRC connected state the UE capability information will be downloaded from the MME to the eNB.

The UE radio network related capability information is grouped, where each group reflects a certain type of capabilities. Examples of such capability groups are:

Radio Frequency (RF) Parameters
Measurement Parameters
Inter-RAT (Radio Access Technology) Parameters The RF-Parameters includes, e.g., supported EUTRA frequency bands, supported EUTRA band combinations.

Measurement Parameters includes information about the UE need for DL measurement gaps while performing inter-frequency measurements when UE operating on a specific E-UTRA band or on a specific E-UTRA band combination.

Inter-RAT Parameters includes information about the supported frequency bands for each other RAT the UE support. UE Capabilities and reporting thereof is defined in 3GPP TS 36.300 (mainly section 18) and 3GPP TS 36.331.

In the following "network capability" refers to the "UE radio network related capability".

Most network capabilities are reported in a binary manner hence a UE can only state to the network node that it is capable of the associated feature if simultaneously supporting it on all configured carriers. Moreover, a UE can only state that it is capable of a feature if it can handle it simultaneously with all other features it reports to be capable of.

With introduction of more complex methods for interference cancellation to meet denser network deployment (ultra-dense network deployment), the requirements on the baseband processing capacity on UE side increases dramatically, and therefore introduction of new features often require a new generation of baseband hardware.

In many foreseen network deployments it is still so that a few carriers are used for macro or micro cell deployment, i.e. cells with large radius providing mobility, and the rest of the carriers may be smaller cells, e.g. pico and femto-cells with small radius, depending on physical constraints on how wide area electromagnetic waves can penetrate as frequency increases. Hence, many of the features are not to be used on all configured carriers simultaneously, but only on a few of them. However, the UE has to be dimensioned to handle the feature on all carriers simultaneously in order to state capability for that feature. This implies that, in future 5 CA with five aggregated carriers, deployment scenarios it is not likely that very advanced interference cancellation will be needed on all carriers simultaneously. At least one carrier is to be a macro or micro cell to provide wide area coverage for mobility. Moreover, due to different characteristics of cells on different carriers, it is not likely that it will be meaningful using OTDOA on all configured carriers.

Further, a UE capable of aggregating say 5 carriers may have spare capacity that can be used for supporting additional features when fewer than maximum 5 carriers are configured.

Capability handling needs to become smarter in the future to avoid exploding growth of UE complexity and to allow new functionality to be introduced earlier, without having to wait for next generation of baseband hardware.

SUMMARY

An object of the present disclosure is to provide a wireless device which seeks to mitigate, alleviate, or eliminate one or more of the above-identified deficiencies in the art and disadvantages singly or in any combination and to provide a solution wherein the UE capacity is utilized to a larger extent than otherwise possible, allowing benefits in increased system and/or UE throughput. The idea in the proposed solution is that the network node presents feature combinations to the UE that are applicable to that particular area with respect to implemented support in the network. The UE is then only requested to report capabilities in respect of the presented subset of features. This may be a subset of the functionality to which the UE reports capabilities in the prior art, or functionality on a subset of the maximum number of carriers under the network node.

Moreover, the network node may present reduced feature combination sets, where although it has support for a function or feature on all its carriers (here including also carriers managed by other network nodes in cooperation with the first network node, e.g. cooperation between Master eNodeB (MeNB) and Secondary eNodeB (SeNB) in dual connectivity operation), it will only configure the UE to use a particular feature on a given number of carriers which may be lower than the total number of carriers, or it may exclude the combination of particular feature combinations on the same carrier. The idea with the reduced feature combination sets is that although a UE cannot support every feature on every carrier, it can support it on a limited number of carriers and thereby improve e.g. the system and/or UE throughput.

This object is obtained by a method, performed in a wireless device, for providing a network capability report to a radio network node. The method comprises receiving, from a network node in the wireless communications network, information specifying features, typically a subset of possible features that the wireless communication network supports for the wireless device. The method further comprises determining capabilities of the wireless device with regard to the specified features and sending, to the radio network node, a message defining the capability of the wireless device with respect (or based on) to the specified combinations of features.

A UE can support functionalities that otherwise would not be possible given the constraints on available processing capacity and memory. Hence features can be introduced earlier and gradually, without having to wait for next generation baseband hardware. With the proposed methods the amount of data in the UE capability reporting can be kept low, because only supported features can be included in the report.

New functionality can be introduced earlier, without the UEs having to be completely over-dimensioned in order to support it.

In many cases the system throughput can be improved since the alternative would be not to support the functionality on any carrier or in any combination.

According to some aspects it relates to a method, performed in a radio network node, of establishing network capabilities of a wireless device. The method comprises obtaining features that the wireless communication network supports for the wireless device and receiving, from the wireless device, information on a capability of the wireless device with respect to the features supported by the wireless communication network.

The disclosure also relates to the corresponding nodes and to computer programs for implementing the methods.

The method performed in the radio network node, the wireless device, the radio network node and the computer programs executed in these nodes each display advantages corresponding to the advantages already described in relation to the disclosure of the method performed in a wireless device.

Another advantage is that the utilization of the UE capacity can be close to 100% as a general case and not only for the extreme use case used when dimensioning the UE.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1b illustrates cell coverage experienced by UE in the example of FIG. 1a.

DEFINITIONS

Figure 1A:
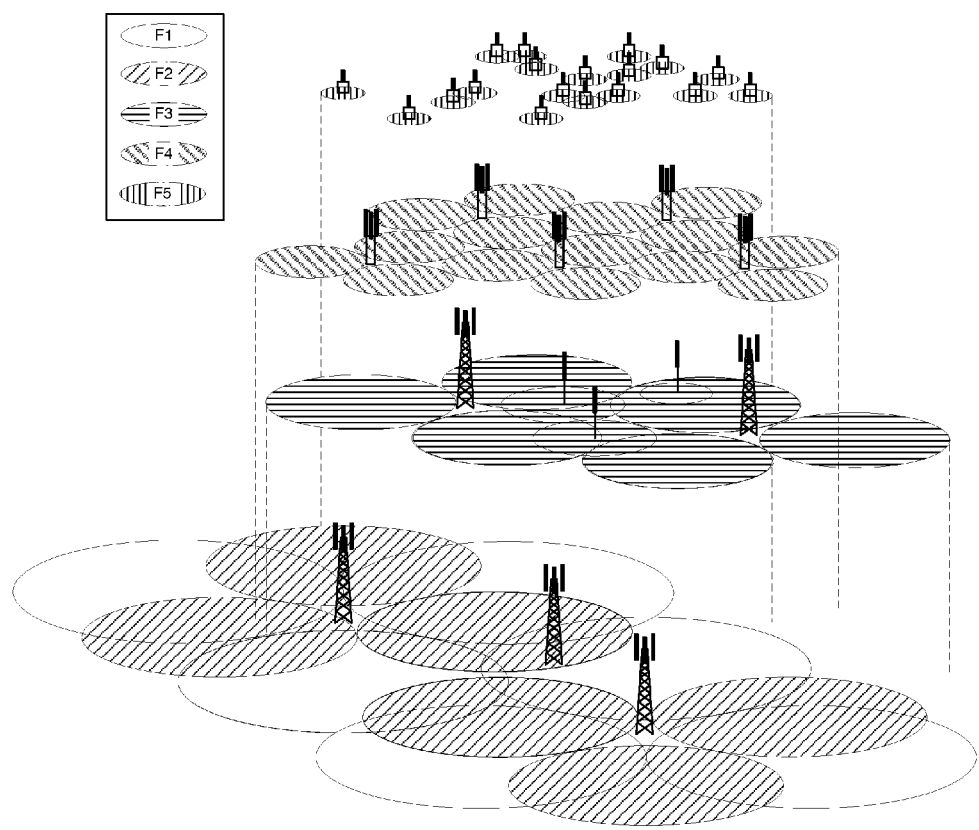
FIG. 1a illustrates an example of future deployment scenario with aggregation using up to 5 DL carriers.
Figure 1B:
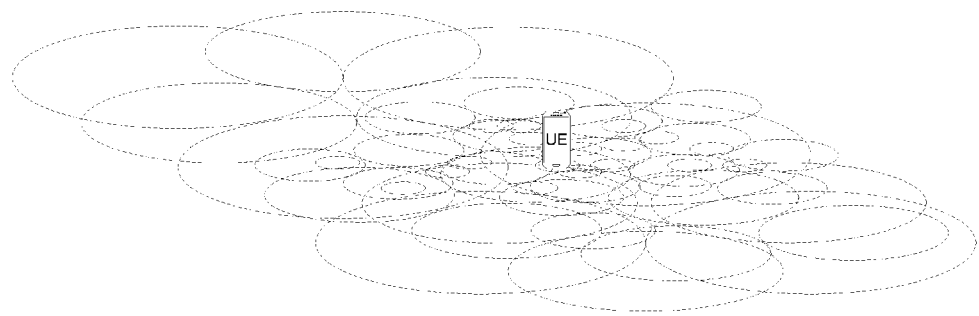

3GPP 3rd Generation Partnership Project
CA Carrier Aggregation
CC Component Carriers
CDMA Code Division Multiple Access
DL Downlink
eNB Evolved Node B
EPC Evolved Packet Core
EUTRA Evolved Universal Terrestrial Radio Access
EUTRAN Evolved UMTS Terrestrial Radio Access Network
GERAN GSM EDGE Radio Access Network
GSM Global System for Mobile Communication
IE Information Element
LTE Long Term Evolution
MME Mobility Management Entity
NAS Non-Access Stratum
NW Network
OTDOA Observed Time Difference Of Arrival
RAN Radio Access Network
RAT Radio Access Type
RB Resource Blocks
RF Radio Frequency
RRC Radio Resource Control
SIB System Information Block
UE User Equipment
UL Uplink
UTRA Universal Terrestrial Radio Access Network

DETAILED DESCRIPTION

Aspects of the present disclosure will be described more fully hereinafter with reference to the accompanying drawings. The apparatuses and methods disclosed herein can, however, be realized in many different forms and should not be construed as being limited to the aspects set forth herein.

In this disclosure we specifically address the dual SIM card scenario, but the same technique can easily be adapted to a multiple SIM card scenario by someone skilled in the art. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

One aspect of the of the example embodiments presented herein is to let a wireless device e.g. a user equipment, UE, indicate in the capability reports that it has conditioned capability for particular features. The network node may then ask the UE whether it supports particular scenarios that are relevant for that network area, and for which the UE has stated conditioned capability. The UE thus indicates to the network node which of the combinations it can support, whereby the network node configures the UE according to the conditioned capabilities.

Another aspect of the example embodiments presented herein provide for means to limit the amount of UE capability information sent from UE to eNB based on the network/eNB needs. The needs are derived from operator configuration and/or implementation.

As part of the development of the example embodiments presented herein, a problem will first be identified and discussed.

Figure 2A:
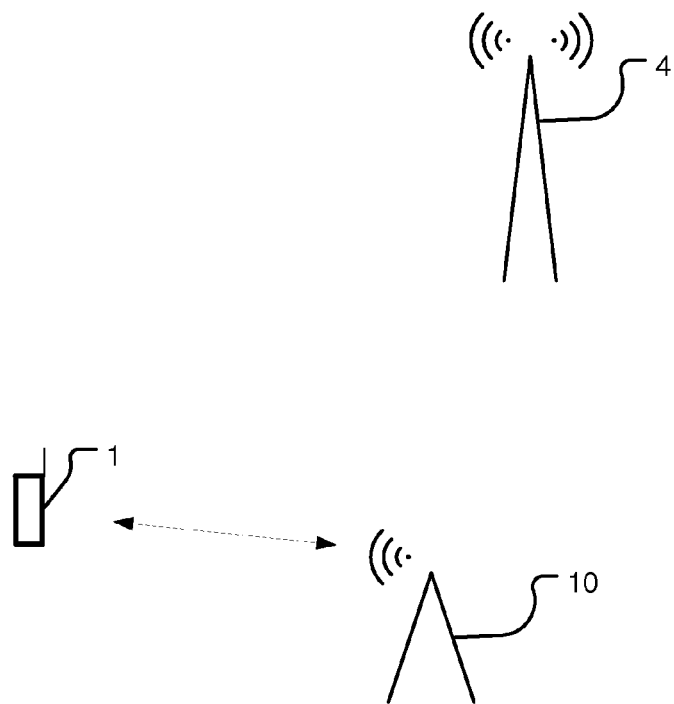
FIG. 2a shows a system where the proposed methods of FIGS. 7 and 8 may be implemented.
Figure 2B:
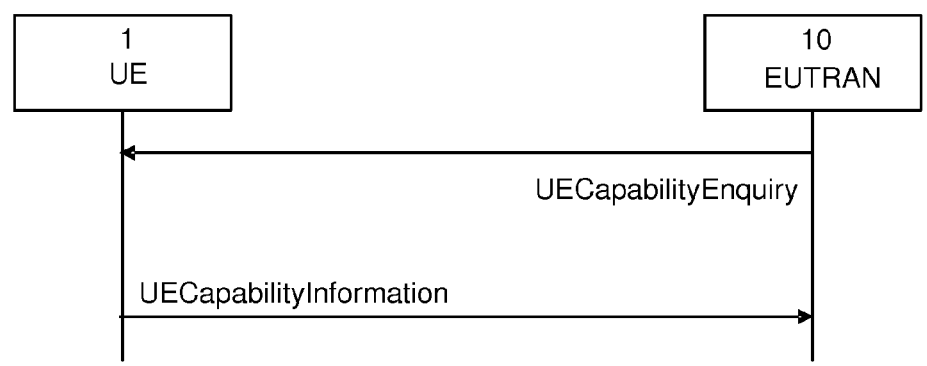
FIG. 2b illustrates signaling at UE capability transfer.

FIG. 2a shows a cellular communication network comprising a radio network node 10, here an eNB, and a wireless device 1, here a User Equipment, UE, where the proposed methods of FIGS. 7 and 8 may be implemented. The cellular communication network is e.g. a 4G or 5G network. The cellular communication network may also comprise further radio network nodes that are communicating with the wireless device.

First it is now explained how the UE 1 under some conditions may have spare capacity, when not configured to its full specification e.g. for a lower number of carriers and/or aggregation bandwidth.

The provided examples are not limiting—there may be many other situations when the UE gets spare capacity, since it in general has to be dimensioned to handle all combinations of features for all supported carriers simultaneously.

What is stated below regarding number of carriers may in another scenario transfer to combination of features, e.g. whether to use advanced interference cancellation and at the same time using the same cells e.g. for OTDOA (which is a positioning method with relatively high complexity).

Figure 3:
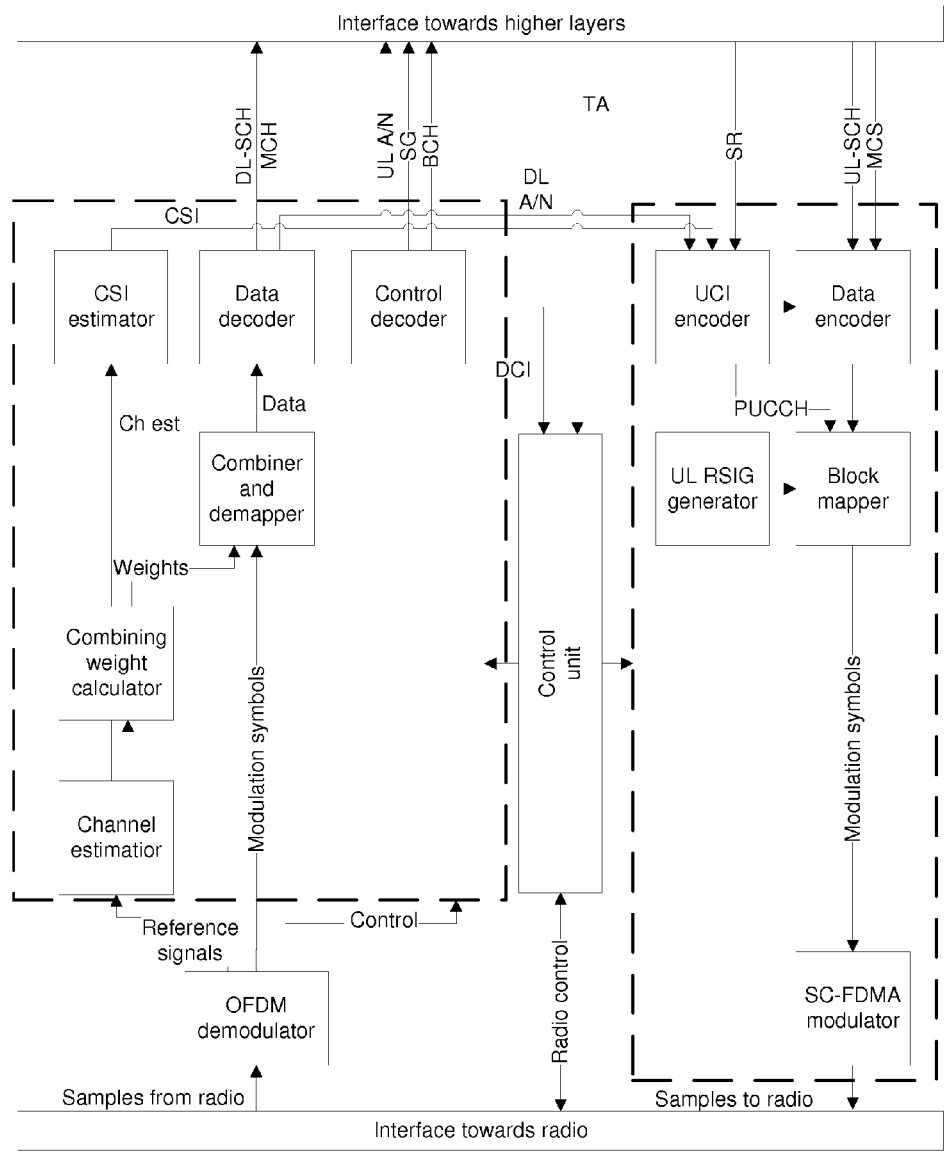
FIG. 3 is a sketch of LTE physical layer downlink and uplink processing.

A simplified sketch of the LTE physical layer in a UE is provided in FIG. 3. Samples are received from the radio, and subjected to an FFT in the OFDM demodulator. The output comprises resource elements carrying e.g. modulation symbols and reference signals. The reference signal are used by the Channel estimator for estimating the radio channel, and from the channel estimates and information on transmission mode and allocated bandwidth the optimum combining weights are derived by the Combining weight calculator. Some reference signals are also used by the CSI estimator for calculating channel state information (CSI) which is fed back to the network node. Received modulation symbols and combining weights are fed to the Combiner and demapper which produce soft bits, which further are input to either of the decoders, depending on channel.

The UE first receives and decoded Physical Downlink Control CHannel (PDCCH) to find downlink control information (DCI) providing information on allocations on Physical Downlink Shared CHannel (PDSCH) as well as the transmission mode and modulation and coding scheme (MCS) in use, uplink allocations (scheduling grant; SG), uplink power control commands, etc. However before receiving it the UE decodes the physical control format indicator channel (PCFICH) which tells how large the control region is, i.e., how many of the initial OFDM symbols in the subframe are carrying PDCCH. Also, before the decoding the radio propagation channel needs to be estimated and combining weights be produced.

PDCCH is convolutional encoded and is decoded by the Control decoder. The decoded DCI is fed to the Control unit which is used for configuring the baseband. The Control decoder further outputs feedback from the network node on whether transmissions on the uplink were successfully decoded or not (UL ACK/NACK; UL A/N), and is also used for decoding the master information block (MIB) carried on PBCH (physical broadcast channel).

Once the DCI has been decoded, generally at a point in time about in the middle of the subframe, the PDSCH is next. Remaining reference signals in the subframe are used for improving the channel estimates, combining weights are tailored for the transmission mode in use, and then the received modulation symbols are combined and demapped, resulting in soft bits to be subjected to decoding. Since the whole subframe has to be received before the decoding can start, timing-wise this happens in the following subframe, in a pipelined fashion, while control information is received and decoded.

PDSCH is turbo encoded and it is decoded using the Data decoder which mainly comprises hybrid automatic request (HARQ) functionality with associated soft bit combiner, and a turbo decoder. The turbo decoder iterates the decoding until the received data is successfully decoded (as indicated by a successful cyclic redundancy check; CRC) or until running out of time (iterations). In case of failure to decode it may give up earlier if metrics indicate that not much more information is corrected in subsequent iterations, so called early give-up function (EGF). Due to the pipelined fashion of processing the turbo decoder has to finish within the duration of one subframe. Feedback on whether data was successfully decoded or not (ACK/NACK; DL A/N) is provided to the network node in subframe n+4, where subframe n is the subframe where the data was received.

The CSI reporting may be either periodical, by which the UE knows beforehand when it is to be reported, but may also be a periodical by which the UE gets informed in the DCI that a CSI report is to be sent in subframe n+4.

The processing time for the OFDM demodulator, Channel Estimator, Combining weight calculator, Combiner and demapper, and Control decoder is highly dependent on the bandwidth in use, whereas the processing time for the Data decoder mainly depends on the UE category which is dictating the size of the HARQ buffers.

When the UE has received an SG in subframe n, it is to transmit on the physical uplink shared channel (PUSCH) in subframe n+4. Scheduling requests (SR), DL A/N, and CSI constitute the uplink control information (UCI) which is encoded by the UCI encoder. Data to be transmitted is encoded by the Data encoder which carriers out Turbo encoding, and then UCI is inserted.

The modulation symbols are fed to the Block mapper, which maps the modulation symbols and uplink reference symbols, produced by UL RSIG generator, to the granted allocation. The resulting sequences of symbols are fed to the SC-FDMA modulator which essentially carries out an IFFT, and the output is sent to the radio.

In case no scheduling grant is received but the UE is to provide UL A/N, CSI and SR, the information is transmitted on the physical uplink control channel (PUCCH) according to a predefined format.

The processing time for UL RSIG generator, Block mapper, and SC-FDMA modulator is highly dependent on the bandwidth in use, whereas the processing time for Data encoder is depending on the UE category.

Further, due to timing advance (TA) and the standard stipulating that cell radius up to 100 km shall be supported, the uplink subframe n may have to be transmitted 0.67 ms before downlink subframe n has been received. Hence the UE will have to be able to do all data- and CSI-related processing of a subframe within roughly 2 ms, to meet the times for DL A/N, acting on aperiodic CSI reporting requests, acting on UL A/N from network node, etc.

It shall be noted that due to cost and power effectiveness a UE is generally designed with just the processing capacity, memory size, etc. needed for the supported features and capabilities, e.g. number of DL and UL carriers, respectively, and supported bandwidth for each of them. This is reflected e.g. by that the FFTs and IFFTs are designed to meet the deadlines on OFDM symbol basis, but not much quicker.

Figure 4:
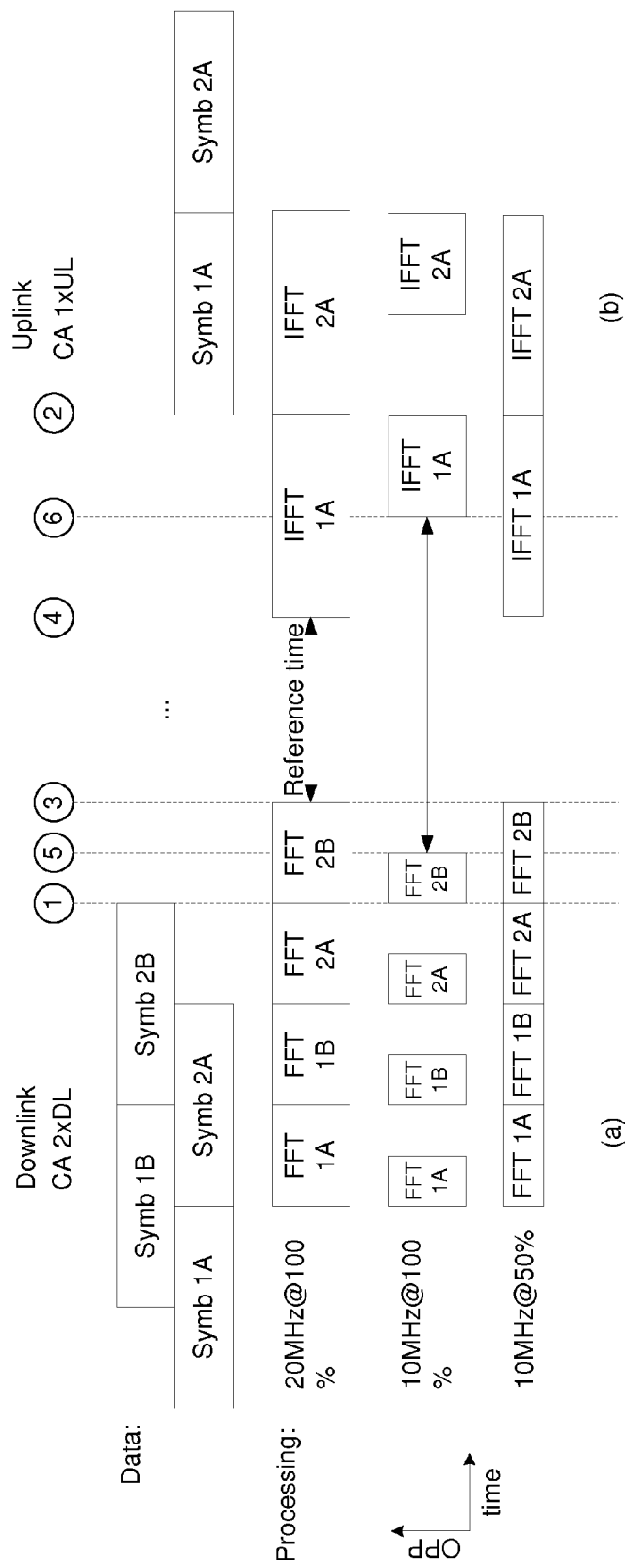
FIG. 4 illustrates OFDM symbol demodulation and SC-FDMA symbol modulation in UE capable of 2×DL and 1×UL CA over 40 and 20 MHz, respectively.

Timing diagrams for a hypothetical UE supporting 2×DL and 1×UL CA, is illustrated in FIG. 4 for two consecutive OFDM symbols to receive and transmit.

FIG. 4 (a) shows the FFT processing when receiving OFDM symbols from carriers A and B, with PCell-to-SCell time difference of less or equal to half an OFDM symbol, which is the maximum time difference needed to support (3GPP TS 36.300 Annex J.1). The FFT is run consecutively for the two carriers, and three examples are shown: running FFT on 20 MHz carriers at 100% clock frequency, and 10 MHz carriers at 100% and 50% clock frequency, respectively. The reason for reducing the clock frequency is to lower the power consumption by selecting what is referred to as a lower operating performance point (OPP). As shown, the delay between the carriers is not an issue since for instance in the 20 MHz@100% and 10 MHz@50% cases the FFT is anyway busy with processing Symbol 1A while Symbol 1B is received. FIG. 4 (b) shows the corresponding uplink processing, involving a single carrier.

The net time available for the time from transport block reception to transmission of e.g. DL A/N is illustrated by lines (3) and (4) for aggregation of 2×20 MHz cells at 100% OPP, or 2×10 MHz cells at OPP 50%. The time span represented by the lines (3) and (4) is immediately impacted by TA.

In case aggregating 2×10 MHz cells at 100% OPP, the corresponding time is illustrated by lines (5) to (6). This time is significantly longer for same TA as above, since the FFT and IFFT which are handling the time critical real-time processing take about half the time compared to e.g. the 2×20 MHz case. Further, although not visible but as outlined above, most other processing also takes less time when the aggregated bandwidth is smaller than the UE is designed for. As a result, there will be more processing time available, which can be used for more advanced (hence processing-intense) algorithms e.g. for channel estimation, interference cancellation, data decoding, et cetera, and/or more complex transmission modes. For example Transmission mode 9 (TM9) with 8 Tx, which implies that the eNB uses 8 antenna ports for downlink transmissions, and data may be transmitted to a UE on up to 8 MIMO layers simultaneously. Further, memory footprint for less-than-designed-for aggregation bandwidth will be smaller, further allowing the more advanced algorithms to use more memory.

Figure 5:
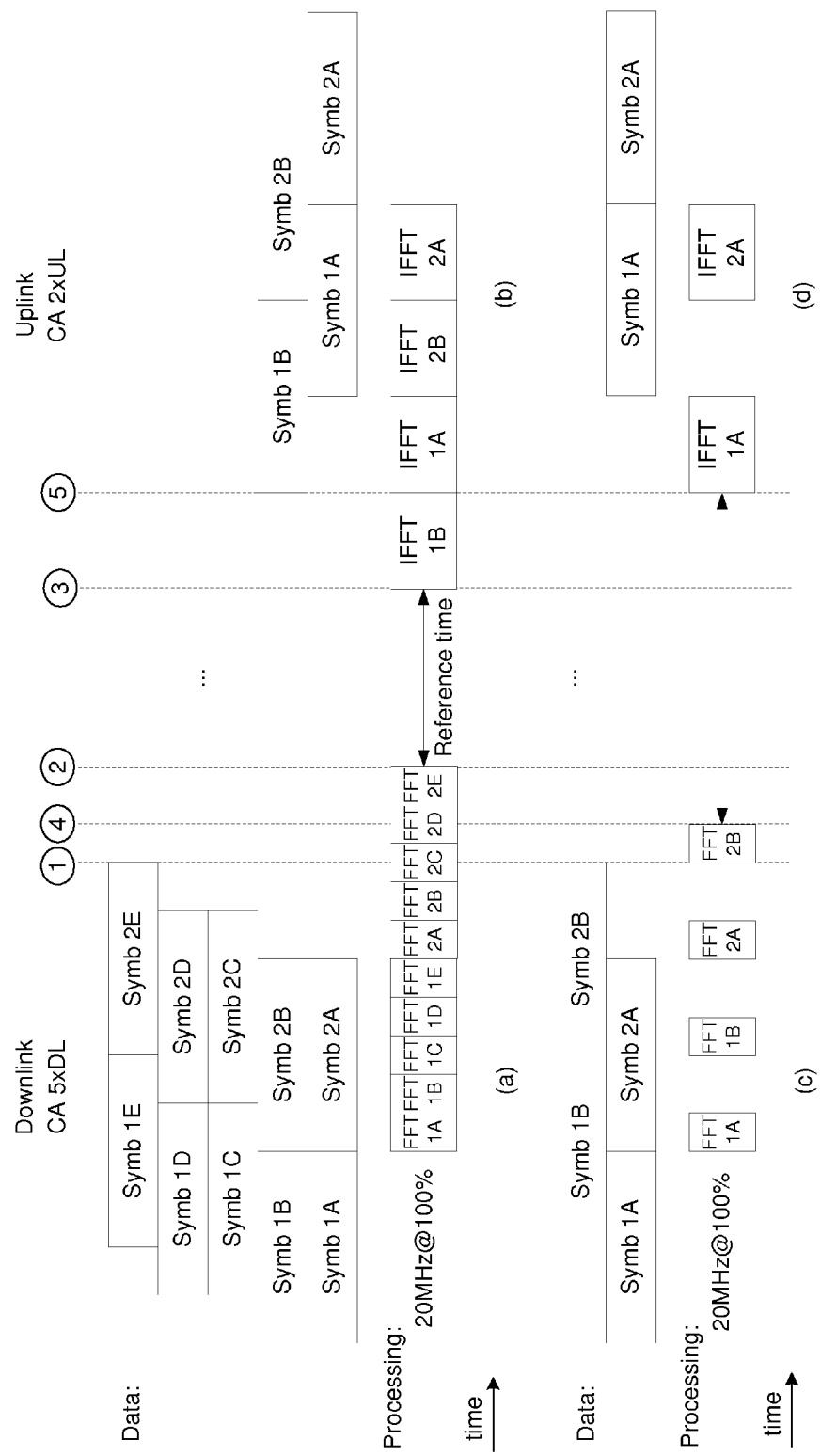
FIG. 5 illustrates OFDM symbol demodulation and SC-FDMA symbol modulation in UE capable of 5×DL and 2×UL over 100 and 40 MHz, respectively.

Another example of a hypothetical UE implementation supporting 5×DL and 2×UL (i.e. aggregation of 5 carriers on the downlink and 2 carriers on the uplink) CA is shown in FIG. 5. FIGS. 5 (a) and (b) show the timeline for FFT and IFFT when processing 5 DL carriers and 2 UL carriers sequentially, where the maximum PCell-to-SCell time difference, and TAG difference, both are within half an OFDM symbol. This gives the available time for other processing as indicated by the span between lines (2) and (3).

FIGS. 5 (c) and (d) show a corresponding timeline when only two out of five carriers are aggregated on the downlink, and only a single carrier is utilized on the uplink. The corresponding time span available for other processing increases significantly, as indicated by lines (4) and (5). Further, with fewer carriers than designed for the other processing also takes less time (channel estimation for 2 out of 5 carriers, etc.). This allows more advanced algorithms or transmission modes to be supported.

The essence of the examples is that a UE designed to meet a particular requirement may support more advanced functions or features when not configured to the full capacity it was designed for. If fewer-than-designed-for carriers are used in carrier aggregation, or if the aggregation bandwidth is less than designed for, there is available capacity for more complex algorithms and more complex transmission modes.

Since the deployment scenarios differ, it would make sense to allow flexibility from UE side regarding feature support and allow it to adapt to the network environment it is in. Only the network node knows fully how many carriers are deployed and can be aggregated, what the cell bandwidths are, what features are supported on the different carriers, and so on. Hence, it makes sense to have the network node enquiring a UE about e.g. foreseen aggregation scenarios and feature combinations provided that the UE has indicated to the network node that it has "soft capabilities", i.e., can support a feature under particular conditions, but not e.g. when configured by the network node to use its full capacity e.g. regarding DL and UL aggregation bandwidths. By utilizing the processing capacity of the UE as much as possible, the system throughput can be increased, since e.g. more advanced concepts of interference cancellation allow the UE to perform better.

The alternative today is in general for the UE to state that it is not capable of a feature, unless it can support it on all carriers and maximum aggregation bandwidths. This means that the UE is designed for some maximum processing capacity (max number of carriers, combination of all features on each carrier, etc.), but in most live networks only a fraction of it will be used. Unless getting smarter in the usage of the UEs processing capacity, future features (NA-ICS etc.) may cause an explosive growth in UE complexity—hence a paradigm shift is needed.

Due to the vast number of current and future baseband architectures, e.g. fixed HW scheduling, flexible HW scheduling, static memory layout, flexible memory layout, HW-defined processing, SW-defined processing, et cetera, the "soft capabilities" may differ for different implementations and features. Extending the existing capability reporting to allow all conditions for all supported features and band combinations to be stated would lead to a huge increase in message size. Hence, it is proposed that the UE only indicates on feature basis whether it has "soft capability" (may also be called "conditioned capability") in case it cannot support the feature when configured according to maximum specification. The network node then asks the UE which combinations relevant in that area it can support. Thereby it is avoided to signal information that anyway is not relevant to that network area.

When asking the UE the network node may include the maximum feature and carrier combination set available in that area, and additionally reduced feature and carrier combination sets as fallback. As an example, although it would be possible to run OTDOA on all 5 carrier frequencies available under the network node, the network node may ask the UE about a feature combination where OTDOA is using only 2 out of 5 carriers in combination with some other feature supported one or more carriers. The network node hence is declaring which configurations it can consider for the UE, including subsets of available combinations, thereby allowing the UE to determine whether its capacity e.g. with respect to memory and processing would be sufficient.

The proposed technique is further illustrated referring to the wireless device and network node below.

An example of the interaction between the network node 10 (e.g. an eNodeB) and the UE 1 is illustrated by the message sequence chart in FIG. 6, and further detailed below. The capability reporting may e.g. comprise the steps a. to f. as follows.

a. The network node 10 requests the capabilities to be reported by the UE 1.

b. The UE 1 sends the capability report, potentially indicating for some of the features/functions that it has a conditional support, here referred to as a soft capability. A conditionally supported function or feature refers to a feature that the wireless device, cannot support to full extent. This implies e.g. that the wireless device cannot support it for all cells, all bands or in combination with certain other features.

c. In case the UE has reported soft capabilities for features that are used in that cell or group of cells, the network prepares a list of relevant feature combinations, number of carriers used for aggregation, etc.

d. The network node sends the list of feature combinations and carriers for the UE to state whether it can support it.

e. The UE checks the list, and indicates which combinations it can support.

f. The UE sends the report to the network node, which takes the indicated support into account in the scheduling of the UE.

Figure 7A:
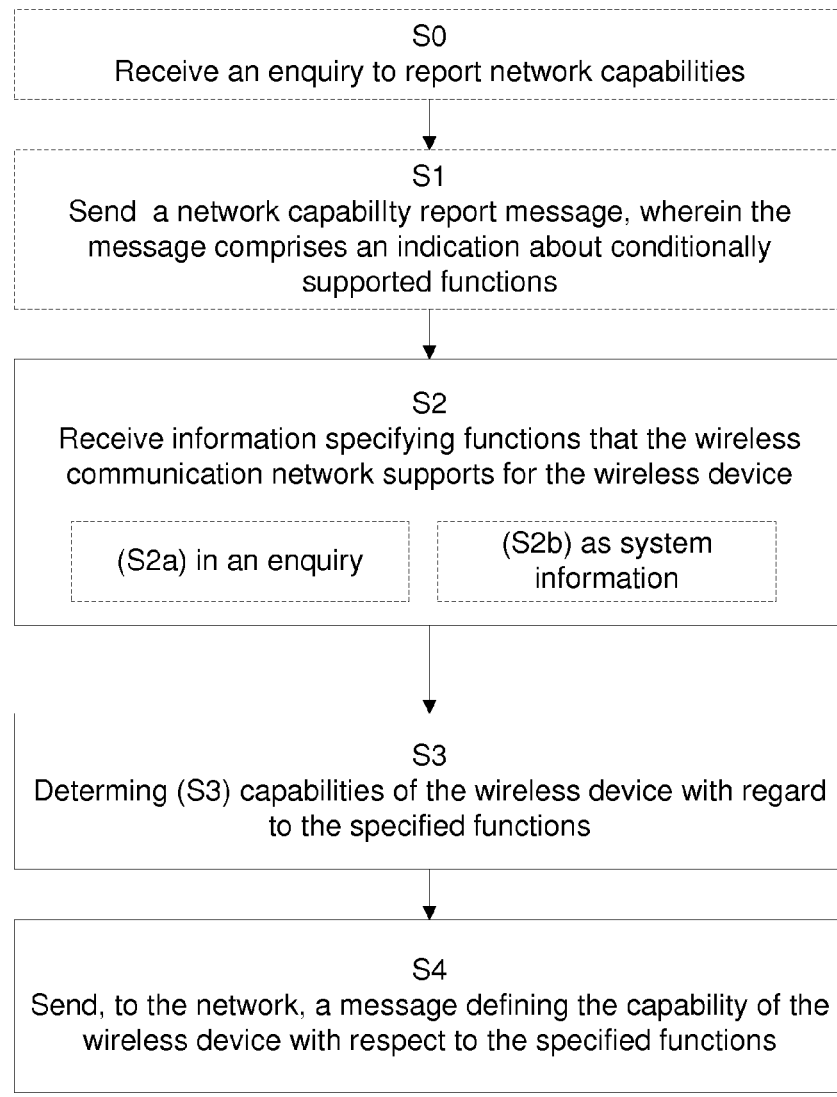
FIGS. 7a and 7b are flowcharts illustrating the method steps performed in a wireless device.
Figure 7B:
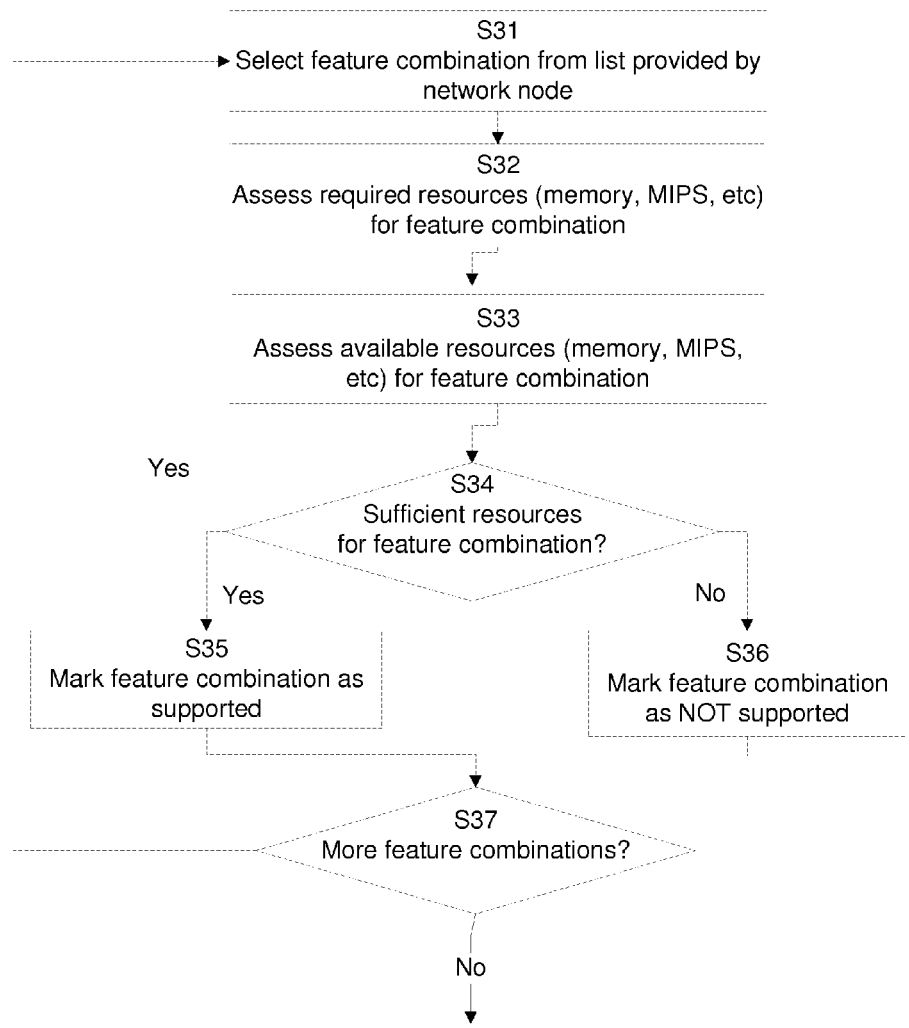
Figure 9:
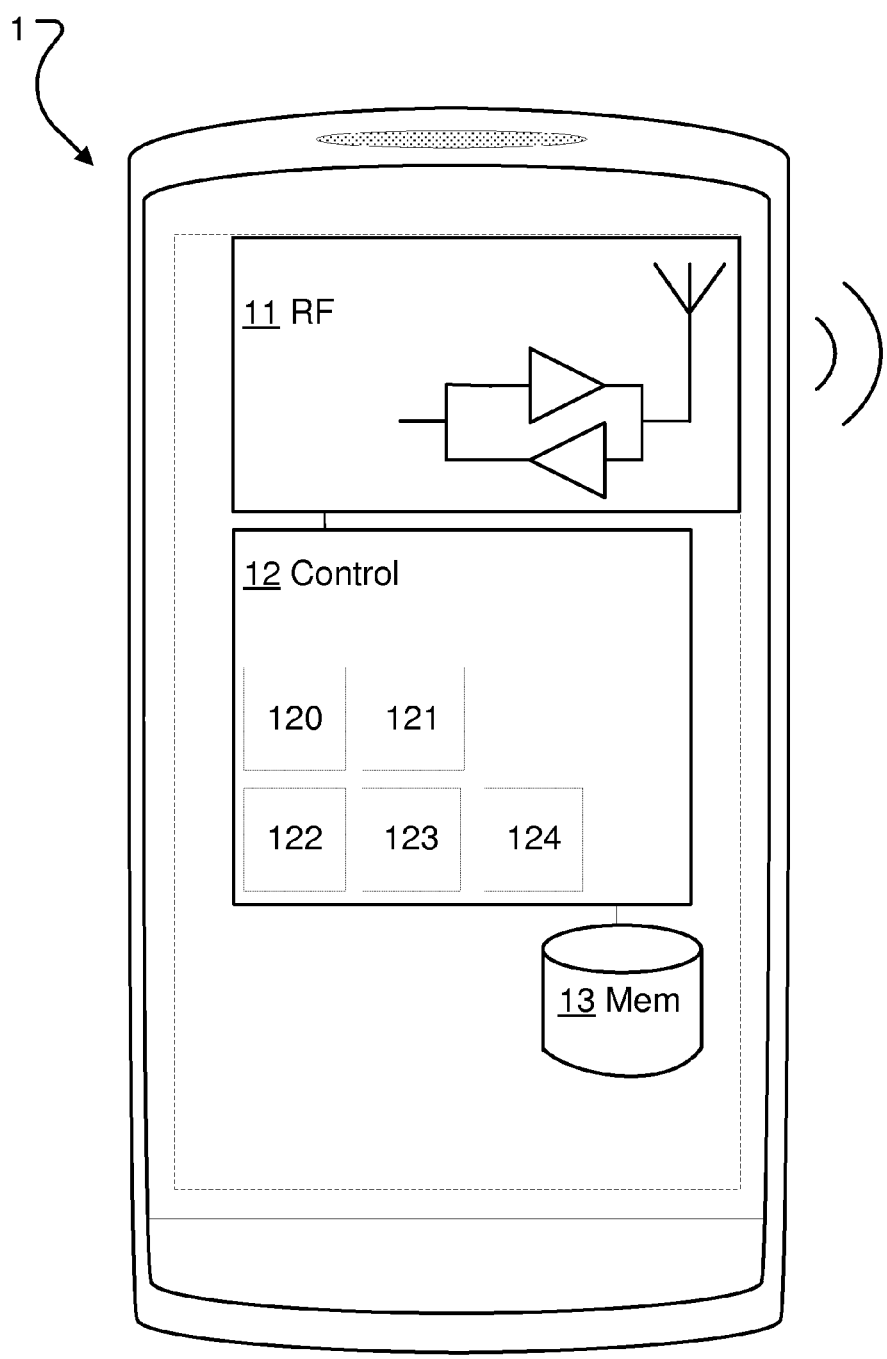
FIG. 9 is an example node configuration of a wireless device, according to some of the example embodiments.

The proposed technique of multi access handling performed in a wireless device will now be briefly described referring to FIGS. 7a, 7b and 9. According to some aspects, the disclosure relates to a method, performed in a wireless device, for providing a network capability report to a radio network node 10.

FIG. 9 illustrates an example of a wireless device which may incorporate some of the example embodiments discussed above. As shown in FIG. 9, according to aspects, the wireless device 1 comprises a radio circuitry 11 configured to receive and transmit any form of communications or control signals within a network 20.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements. In the 3GPP specifications the term User Equipment, UE, is used.

It should be appreciated that the radio circuitry 11 according to some aspects comprises any number of transceiving, receiving, and/or transmitting units or circuitry. It should further be appreciated that the radio circuitry 11 may be in the form of any input/output communications port known in the art. The radio circuitry 11 according to some aspects comprises RF circuitry and baseband processing circuitry (not shown).

The wireless device 1 according to some aspects further comprises at least one memory unit or circuitry 13 that may be in communication with the radio circuitry 12. The memory 14 may be configured to store received or transmitted data and/or executable program instructions. The memory 13 may also be configured to store any form of beamforming information, reference signals, and/or feedback data or information. The memory 13 may be any suitable type of computer readable memory and may be of volatile and/or non-volatile type.

The processing circuitry 12 may be any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but may be provided as any number of units or circuitry.

The processing circuitry is configured to cause the wireless device 1 to receive, using the radio communication interface 11, from a network no in the wireless communications network (20), information specifying features, that the wireless communication network supports for the wireless device and to determine capabilities of the wireless device with regard to the specified features. The processing circuitry is further configured to send, using the radio communication interface, to the radio network node 10, a message defining the capability of the wireless device with respect to the specified features.

FIG. 7a is a flow diagram depicting example operations which may be taken by the wireless device of FIG. 9, during capability reporting, according to some of the example embodiments.

It should be appreciated that FIGS. 7a and 7b comprises some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

FIG. 7a illustrates a more general illustration of the methods, whereas FIG. 7b also shows an example implementation of one of the steps in more detail.

Figure 6:
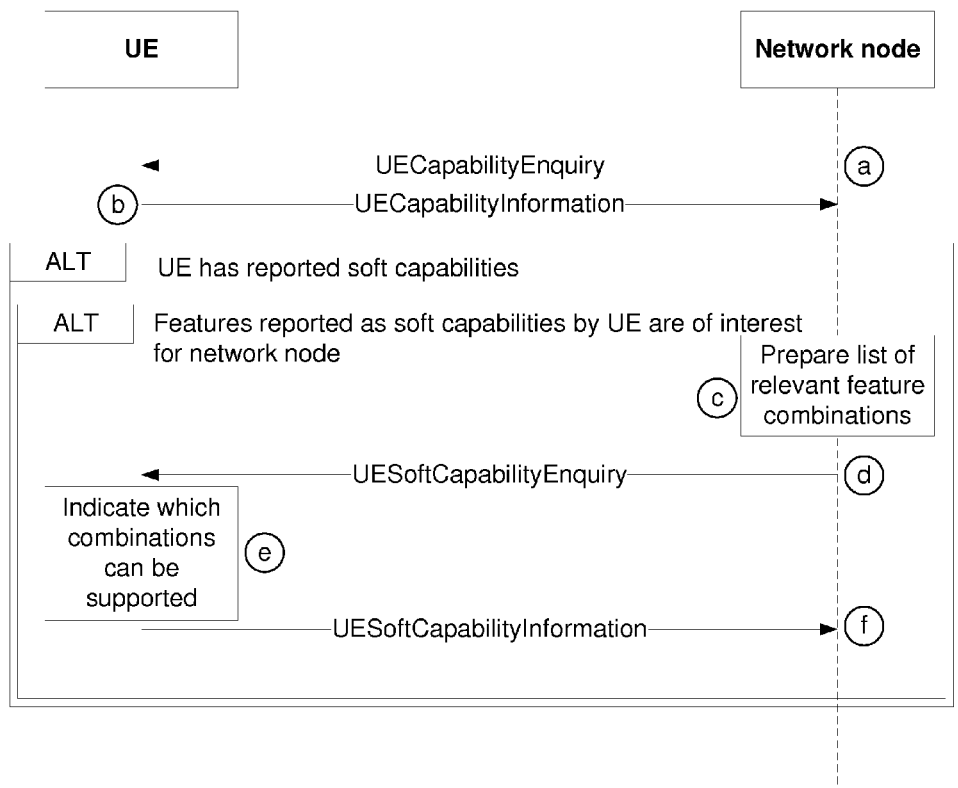
FIG. 6 illustrates the signaling between a UE and a network node, when establishing the UE on soft capabilities.

According to some aspects capability reporting is initiated by the wireless device receiving S0, from the wireless communication network, an enquiry to report network capabilities, see FIG. 6 step (a). The processing circuitry 12 is configured to enquire the capability reporting. According to some aspects, the wireless device comprises an enquiry module 120 configured for this purpose.

According to some aspects the wireless device then sends S1 to the network, a network capability report message, wherein the message comprises an indication about conditionally supported features. See arrow (b) in FIG. 6. A network capability report message is e.g. a UE capability report as defined in 3GPP TS 36.331 V12.10.0 section 5.6.3. According to this embodiment, the network node requests the wireless device to specify supported combinations of the conditionally supported features.

According to some example embodiments the information specifies supported or feasible combinations of features a certain radio network node. The support is e.g. limited by the hardware of the radio network node or any other access node. Hence the supported features are typically specified for a number of cells, e.g. for a number of aggregated cells.

The processing circuitry 12 is configured to send the message. According to some aspects, the wireless device comprises a sender module 121 configured for this purpose.

However, another possible scenario is that there is no signaling regarding conditionally supported features, but that the capability reporting is based on information about supported features in the network. In such a scenario, the network may broadcast information about supported functionality, wherein the capability reporting would be adjusted to only include relevant data. This variant will be explained further below in connection to the operation of a radio network node.

According to the proposed technique a wireless device 1 receives S2, from a network node 10, 4 in the wireless communications network 20, information specifying features that the wireless communication network supports for the wireless device 1. This is typically a subset of a full set of features. The full set is e.g. all features and functions of the radio access technology (or technologies) implemented in the radio network node 10. Referring back to the UE capabilities, the information may define that a subset of the features are supported and that some features are only supported in certain cells or in certain combinations.

Note that this information may be received from the radio network node 10, to which the wireless device is about is about to report its capabilities. However, it would also be possible to receive the information from another network node, such a network node 4. One example is when different systems are used for data and control information. The network may transmit the supported combinations as system information or as dedicated messages. The combinations may either be UE specific or it may be the same for all UEs in an area.

"Feature" or "function" is here used as a non-limiting term that includes for instance all present and future functionalities which the UE may or may not be capable of supporting, e.g. specified in any existing and/or future revision of 3GPP TS 36.306 "User Equipment (UE) radio access capabilities", 3GPP TS 36.331 "Radio Resource Control; Protocol Specification" Feature Group Indicator annexes, and other such documents for existing and future radio access technologies. It may also include band and/or carrier combinations, bandwidth combinations, number of carriers on downlink and uplink, respectively; combination of connections (e.g. dual connectivity), RAT combinations (non-aggregated or aggregated), UE categories, etc. In essence, by feature it is here meant any configuration of network and/or UE that has an impact on or may be limited by processing capacity, memory capacity, power consumption and the alike.

According to one aspect, the receiving implies receiving the information from the radio network node 10. Alternatively the wireless device or UE may receive the information from the radio network node 10 or from another radio network node 4. The network may transmit the supported functions as system information or as dedicated messages. The supported functions may either be cell or cell group specific or it may be the same for an area covered by one or more base stations. In case of dedicated message the supported function or feature combinations may further be tailored for the UE based on brand, model, revision of supported standard(s). In case of broadcasting there may be different sections of the system information or different system information blocks applicable for UEs supporting different revisions of the standards.

According to some aspects the information comprises one or more predefined combination of functions that the wireless communication network supports, for example for different cells in carrier aggregation.

According to some aspects the information is comprised in an enquiry to specify conditionally supported functions, received from the wireless communication network as shown as step (d) in FIG. 6. For example, the wireless network sends an enquiry to the wireless device that comprises a list of combinations of features that the network node intends to use. The enquiry requests the wireless device to specify which of the combinations that are supported.

The processing circuitry 12 is configured to receive S2 the information. According to some aspects, the wireless device comprises a receiver module 122 configured for this purpose.

The method further comprises determining S3 capabilities of the wireless device with regard to the specified functions. This step will be further described in connection with FIG. 7b. The processing circuitry 12 is configured to determine S3 the capabilities of the wireless device. According to some aspects, the wireless device comprises a determiner 123 configured for this purpose.

Finally, the method further comprises sending S4, to the radio network node 10, a message defining the capability of the wireless device based on, or with respect to, the specified combinations of functions, see step (f) in FIG. 6. The network node may then use this information, such that the data is transmitted in a way supported by both the network node and the wireless device. The processing circuitry 12 is configured to send the message. According to some aspects, the wireless device comprises a second sender module 124 configured for this purpose.

FIG. 7b illustrates an example embodiment of step S3 in more detail. In the example of FIG. 7b, the UE has received a request on reporting of soft capabilities for a list of feature combinations provided by the network node S2a. The UE analyses for each of the combination (i.e. selects feature combination S31) whether it has capacity or not to handle it S32, S33, and if so S34; YES, it indicates, see step (e) in FIG. 6, in a report that the combination can be supported S35, otherwise S34; NO it indicates that the combination cannot be supported S36. When it has gone through the whole list of combinations S37; NO, it sends the report to the network node S4.

The term analyses may refer to actual calculation being carried out, e.g. based on known memory and processing needs for different features, but may also be a simple look-up table.

Figure 10:
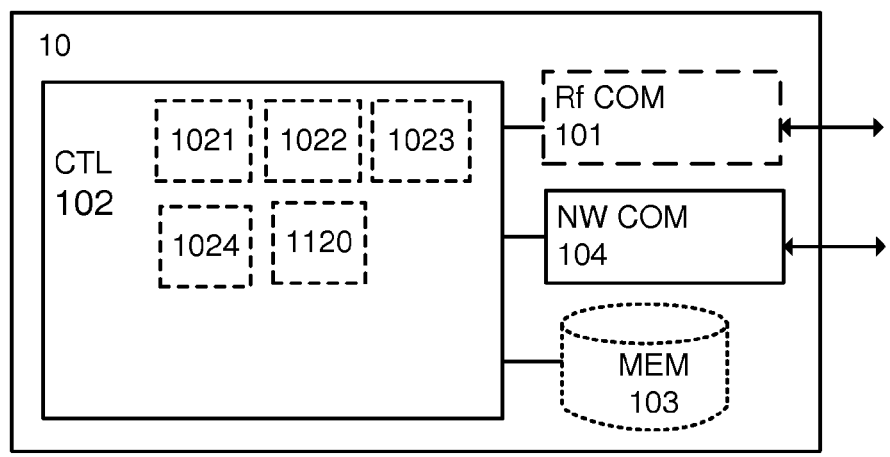
FIG. 10 is an example node configuration of a network node, according to some of the example embodiments.

The proposed technique of multi access handling will in a radio network node now be briefly described referring to FIGS. 8 and 10.

FIG. 10 illustrates an example of a radio network node 10 which may incorporate some of the example embodiments discussed above.

The radio network node implementing the proposed methods is e.g. a base station. According to some aspects the radio network node is not the base station but a node controlling or communicating with the base station such as a base station controller node.

The radio network node 10 may further comprise at least one memory unit or circuitry 113. The memory 103 may be configured to store received or transmitted data and/or executable program instructions. The memory 103 may be any suitable type of computer readable memory and may be of volatile and/or non-volatile type.

The radio network node 10 further comprises a network interface 104 and processing circuitry 102 which may be configured to enquire capability reports from a wireless device as described herein. The processing circuitry 102 may also be configured to provide configuration instructions to the user equipment or wireless device. The processing circuitry 102 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

As shown in FIG. 10, the radio network node 10 may comprise a radio circuitry 101 configured to receive and transmit any form of communications or control signals within a network. It should be appreciated that the radio circuitry 101 may be comprised as any number of transceiving, receiving, and/or transmitting units, modules or circuitry. It should further be appreciated that the radio circuitry 101 may be in the form of any input/output communications port known in the art. The radio circuitry 101 may comprise RF circuitry and baseband processing circuitry (not shown).

According to some aspects, the disclosure relates to a method, performed in a radio network node 10, of establishing network capabilities of a wireless device. As discussed above this method of multi access handling implies selective capability reporting from a wireless device. The part of the methods implemented in a radio network will now be described in further detail.

According to some aspects the network capability reporting is initiated by the network node sending S10, to the wireless device, an enquiry to report network capabilities. The processing circuitry 102 is configured to send the enquiry. According to some aspects, the radio network node comprises a sender module 1020 configured for this purpose.

According to some aspects the radio network node then receives S11, from the wireless device, a message defining the network capabilities of a wireless device, wherein the message indicates conditionally supported functions. As discussed above, this implies that there are some features that the wireless device supports, but that the features are not supported in all scenarios.

When receiving such a message, the network node, needs to request further information in order to find out if the conditional features are supported in the manner that the network node intends to use them. The processing circuitry 102 is configured to receive the network capability report.

According to some aspects, the radio network node comprises a receiver module 1021 configured for this purpose.

According to the proposed method the radio network node obtains S12 functions that the wireless communication network supports for the wireless device. This typically implies that the radio network node knows which functions or combinations of functions it supports or provides for the wireless device. The supported functions may be the same for all wireless devices in an area and could possibly be broadcasted e.g. in system information in a primary cell. Alternatively, the supported functions are device specific. It is possible, that the network cannot support the same functionality for all wireless devices, or all over the cell area.

The combinations are e.g. pre-programmed, downloaded or estimated in the radio network node. This step then simply implies reading such information. The processing circuitry 102 is configured to obtain the supported functions. According to some aspects, the radio network node comprises an obtainer 1022 configured for this purpose.

According to one aspect, the radio network node sends S13, to the wireless device, a message specifying functions that the wireless communication network supports for the wireless device. Hence, the radio network node informs the wireless device about features (or combinations of features) that it can provide. This implies that when reporting its capabilities, the wireless device only needs to care about these features. The processing circuitry 102 is configured to send the message. According to some aspects, the radio network node comprises a second sender module 1023 configured for this purpose.

In any case the wireless device needs to get this information, in order to make a selective capability report. However, the information may possibly also be provided to the wireless device by another network node 4 e.g. as broadcasted information as will be further described below.

The radio network node 10 then receives S14, from the wireless device, information on a capability of the wireless device with respect to (or based on) the functions supported by the wireless communication network. Hence, the information specifies which of the functions obtained in step S12 that the wireless device supports. The processing circuitry 102 is configured to receive the information. According to some aspects, the radio network node comprises a sender module 1024 configured for this purpose.

If the radio network node has previously received S11 information about conditionally supported functions from the wireless device, then according to one aspect, the obtaining S12 comprises analyzing S12a the received message to determine combinations of the conditionally supported functions, that are possible (or implemented) in the network. Additionally, the radio network node may include one or more reduced feature combination sets, for a non-limiting example, although the radio network node supports usage of features X and Y on all M+N carriers, the combination of feature X on M carriers and feature Y on N carriers is also acceptable by the radio network node, and thus is provided as an option. Hence, the radio network node analyses whether there are any conditional or soft features that are supported in this area or by a certain base station.

Alternatively the obtaining S2 comprises retrieving S12b information about combinations of functions that are possible and/or feasible in the network. The combinations are e.g. preprogrammed, downloaded or estimated in the radio network node. In this case the same information would be reported to all wireless devices within an area.

In this embodiment the radio network node (e.g. eNodeB) provides feasible feature and carrier combinations via system information, for instance in a yet-to-be defined system information block. A wireless device (e.g. a UE) that has conditional support for one or more feature combinations acquires said system information e.g. by reading it autonomously, getting it via dedicated signaling, getting it in tunneled information at a handover, retrieving it from a server, or retrieving it from pre-loaded/stored information, etc. The trigger for reading system information on feasible feature combinations may be following a yet-to-de defined standardized procedure, e.g. upon handover and before transition from idle to connected mode, upon getting an indication on that the feasible feature combination in this cell differs from neighbor cells (e.g. an indicator in the master information block which anyway has to be read upon handover), upon getting an indication in tunneled information received before a handover, or getting a yet-to-be defined request from the radio network node, or when entering a cell for which pre-loaded/already retrieved information indicates that the feasible feature and carrier combinations is different from the neighboring cells (e.g. acquired when entering a new tracking area and/or during the network attach).

Upon having acquired the feasible feature and carrier combinations the UE determines which of the presented combinations it can support, and indicates the supported combinations to the radio network node with which it communicates (or another node in the network). The indication may for instance be carried out upon an explicit request from the network node, a yet-to-be defined standardized procedure, upon finding that the set of feasible feature combinations are different in source and target cells, respectively, etc.

Upon receiving the indicated support from the UE, the network node takes it into account in the configuration and scheduling of the UE.

Network nodes may be aware of the feasible feature combinations provided by neighbor cells, e.g. via information exchange between network nodes. In case of 4G, it may be shared over the X2 interface, the S1 interface, or via a yet-to-be defined interface. It may alternatively or additionally acquire the information from another network node deeper into the core network (e.g. MME or RNC).

Additionally, the network node (e.g. eNodeB) may determine the feasible feature combinations by retrieving it from a database where it uses brand, model and other such UE attributes as key. The database may be populated by manufacturers (providing specifications and information entered manually or retrieved from external data sources), by network nodes (e.g. eNodeB) collecting information e.g. using any of the procedures outlined above and storing it in the database, etc. Trigger for actively enquiring the UE about supported feature combinations may be for instance that information about the UE model is missing in the database or that the information is old and needs to be refreshed.

The network node may also determine the feasible feature set for the UE by retrieving it from a database using e.g. IMSI or another unique UE identity as key. If information is missing, the network node actively enquires the UE and then stores information about what the UE supports into the database. Also, if information exists but the UE has been presented another set of feasible feature combinations than used in the current cell(s) under the serving network node, and the current network node's feasible feature combination set is more comprehensive than the one presented to the UE by another network node serving one or more cells that the UE has visited earlier, the network node may actively enquire the UE again. Alternatively, the network node may enquire the UE about the delta (difference) between the feasible feature set presented to it before, and the feasible feature set that is applicable under the currently serving network node.

The information stored in the database may for instance comprise the feasible feature combination set which has been presented to the UE and a Boolean indication (true/false) whether UE supports it. It may be based on the latest feasible feature combination set presented to the UE, or may be an aggregation of several such sets. The data (the set as a whole, subsets, and/or individual data members) may be time stamped and expire after a predefined time, and/or may be invalidated when the UE detaches from the network or leaves the area (group of network nodes spread out geographically).

The subset may be different for different base stations in the network. A full set is network capacities implemented in the radio access technology (or technologies) implemented in the network, that the wireless communication network supports for the wireless device.

Finally the radio network node stores S15 the specified combinations in the radio network node and/or using the specified combinations of functions when scheduling resources for the wireless device.

In an example embodiment, a network node is parsing a UE capability report to determine whether there are soft capabilities that can be exploited. This embodiment is now described with reference to FIG. 8b.

Figure 8A:
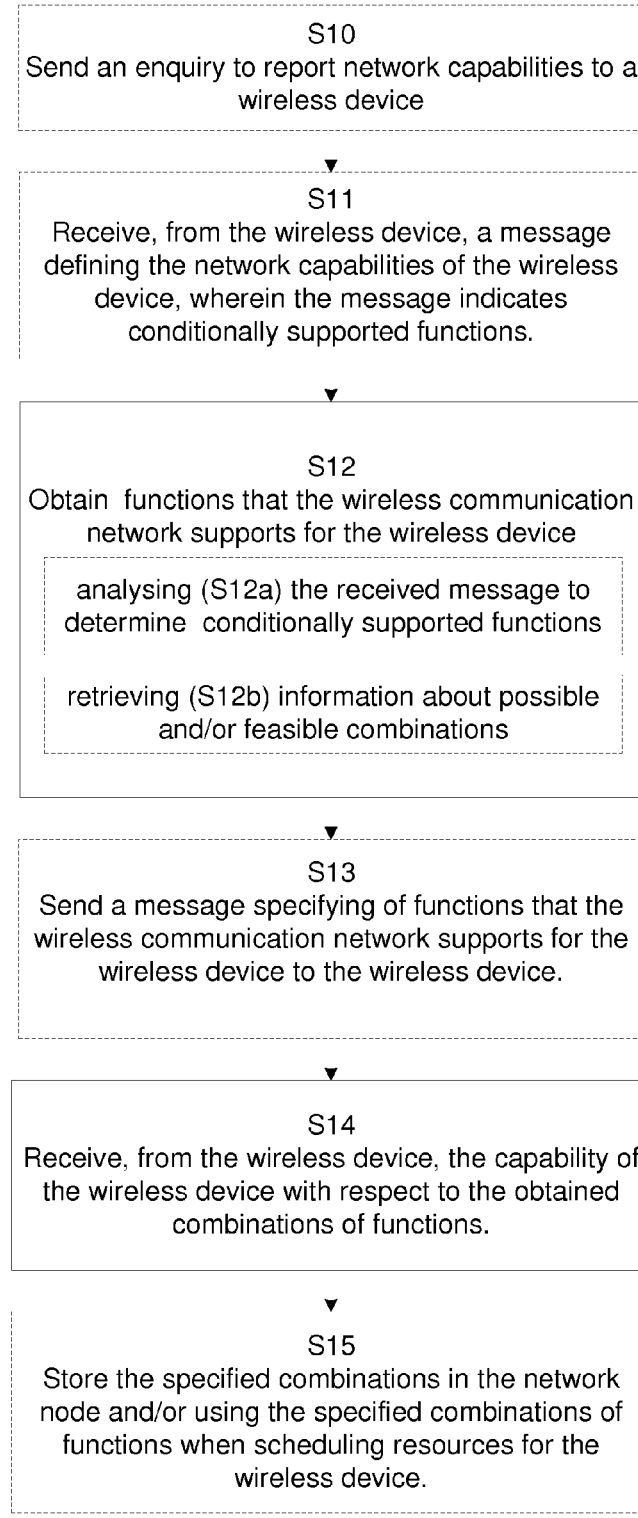
FIGS. 8a and 8b are flowcharts illustrating the method steps performed in a network node.
Figure 8B:
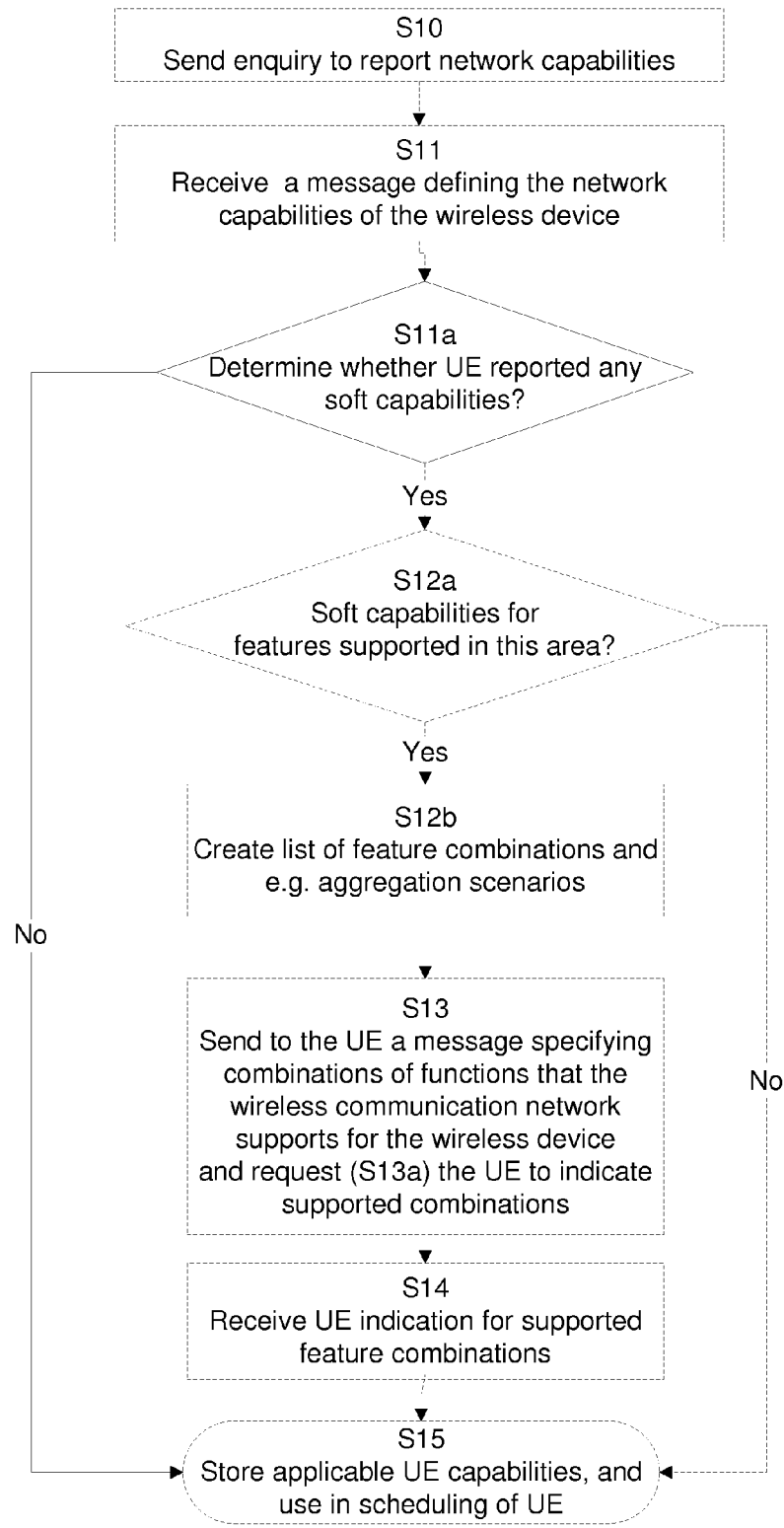

In this example, the network node (e.g. an eNodeB) has received the UE capability report (step S11 in FIG. 8a). It parses S11a the report to see whether the UE besides the supported features also has indicated soft capability for some features. If so S11a; YES, it checks S12a whether the soft capabilities can be exploited given the network deployment. If so S12a; YES, it creates a list of feature combinations S12b, e.g. in case only three carriers are deployed:

"TM9 with 8Tx" (Transmission Mode '9' with 8 transmission downlink carriers) in combination with aggregation of 3×20 MHz for a UE specified to be capable of 5×20 MHz aggregation but with only soft capability for "TM9 with 8Tx".

It may also consider subsets such as for the same UE and same scenario:

"TM9 with 8 Tx" in combination with aggregation of 2×20 MHz, if it is determined that the feature as such may provide better or equivalent throughput for the UE as otherwise obtained without the feature and using more carriers.

The network node then requests S13 the UE to indicate in the list which combinations it can support, by sending a message specifying combinations that the network supports. When the indications are received S14, e.g. that the UE can support "TM9 with 8Tx" for 2×20 MHz aggregation but not for 3×20 MHz (150), it then stores the capability information, and can schedule S15 the UE to use 2 carriers and "TM9 with 8Tx" (160).

TM9 is one example wherein the proposed methods may be implemented. The functionality could for instance also be OTDOA, Observed Time Difference Of Arrival, which is a positioning feature introduced in rel9 E-UTRA (LTE radio). When using the proposed technique, inter-frequency OTDOA might be supported conditioned on that not all up to 5 intra-frequency carriers are used for intra-frequency OTDOA. Here it might be memory rather than processing capacity that is the limiting factor. It could also be NAIC (network assisted interference cancellation).

Another example of a conditionally supported feature is that "TM9 with 8 Tx" can be supported, if OTDOA is not supported on more than say one carrier, and so on.

Although undesirable from message size growth, it can be considered to introduce conditions in the existing UECapabilityInformation message (3GPP TS 36.331 V12.2.0 for several features, e.g. that "TM9 with 8 Tx" is supported for a maximum of 3 carriers, for a UE otherwise supporting aggregation of 5 carriers.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the embodiments, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following embodiments.

The invention claimed is:

1. A method implemented by a wireless device configured for operation in a wireless communication network, the method comprising:
receiving information from the network applicable to a current network area of the wireless device, the information indicating a maximum number of carriers deployed by the network in the network area for carrier aggregation;
identifying a feature of the wireless device that is supported for fewer than the maximum number of carriers deployed for carrier aggregation, said feature referred to as a conditionally-supported feature and being any one or combination of: Observed Time Difference of Arrival (OTDOA) processing by the wireless device, a type of interference cancellation by a receiver of the wireless device, and a certain transmission mode of the wireless device;
determining a configuration that is supported by the device with respect to the conditionally-supported feature, the configuration indicating a limitation on carrier aggregation for the wireless device when using the conditionally-supported feature; and
indicating the supported configuration to the network.

2. The method of claim 1, further comprising receiving the information from the network in response to sending a capability report from the wireless device to the network, the capability report indicating at least one of support for the feature and support for carrier aggregation.

3. The method of claim 1, wherein the conditionally-supported feature cannot be supported by the wireless device on the maximum number of carriers because of processing or memory limitations at the wireless device, and wherein the supported configuration indicates one or more carrier aggregations and the number of carriers within each such carrier aggregation for which the feature is supported.

4. A wireless device configured for operation in a wireless communication network and comprising:
   a radio communication interface configured for communicating with a radio network node in the network; and
   processing circuitry associated with the radio communication interface and configured to:
      receive information from the network applicable to a current network area of the wireless device, the information indicating a maximum number of carriers deployed by the network in the network area for carrier aggregation;
      identify a feature of the wireless device that is supported for fewer than the maximum number of carriers deployed for carrier aggregation, said feature referred to as a conditionally-supported feature and being any one or combination of: Observed Time Difference of Arrival (OTDOA) processing by the wireless device, a type of interference cancellation by a receiver of the wireless device, and a certain transmission mode of the wireless device;
      determine a configuration that is supported by the device with respect to the conditionally-supported feature, the configuration indicating a limitation on carrier aggregation for the wireless device when using the conditionally-supported feature; and
      indicate the supported configuration to the network.

5. The wireless device of claim 4, wherein the processing circuitry is configured to receive the information from the network in response to sending a capability report from the wireless device to the network, the capability report indicating at least one of support for the feature and support for carrier aggregation.

6. The wireless device of claim 4, wherein the conditionally-supported feature cannot be supported by the wireless device on the maximum number of carriers because of processing or memory limitations at the wireless device, and wherein the supported configuration indicates one or more carrier aggregations and the number of carriers within each such carrier aggregation for which the feature is supported.

7. A method implemented by a radio network node configured for operation in a wireless communication network, the method comprising:
   transmitting information applicable to a current network area of a wireless device, the information indicating a maximum number of carriers deployed by the network in the network area for carrier aggregation;
   receiving information from a wireless device that identifies a configuration supported by the wireless device with respect to use of a feature of the wireless device during carrier aggregation, the supported configuration indicating that the feature is conditionally-supported by the wireless device, meaning that the wireless device supports the feature for fewer than the maximum number of carriers deployed for carrier aggregation, and the feature being any one or combination of: Observed Time Difference of Arrival (OTDOA) processing by the wireless device, a type of interference cancellation by a receiver of the wireless device, and a certain transmission mode of the wireless device; and
   determining a carrier aggregation for the wireless device in dependence on the supported configuration, at least when the wireless device operates with the conditionally-supported feature.

8. A radio network node configured for operation in a wireless communication network, the radio network node comprising:
   a communication interface configured for communicating with a wireless device; and
   processing circuitry associated with the communication interface and configured to:
      transmit information applicable to a current network area of the wireless device, the information indicating a maximum number of carriers deployed by the network in the network area for carrier aggregation;
      receive information from the wireless device that identifies a configuration supported by the wireless device with respect to use of a feature of the wireless device during carrier aggregation, the supported configuration indicating that the feature is conditionally-supported by the wireless device, meaning that the wireless device supports the feature for fewer than the maximum number of carriers deployed for carrier aggregation, and the feature being any one or combination of: Observed Time Difference of Arrival (OTDOA) processing by the wireless device, a type of interference cancellation by a receiver of the wireless device, and a certain transmission mode of the wireless device;
      determine a carrier aggregation for the wireless device in dependence on the supported configuration, at least when the wireless device operates with the conditionally-supported feature.

* * * * *